Jan. 12, 1937.   R. B. BAGBY   2,067,750
FILLING MACHINE
Filed April 20, 1936
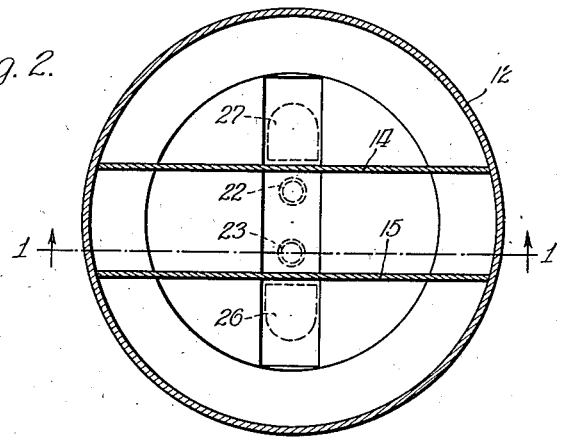
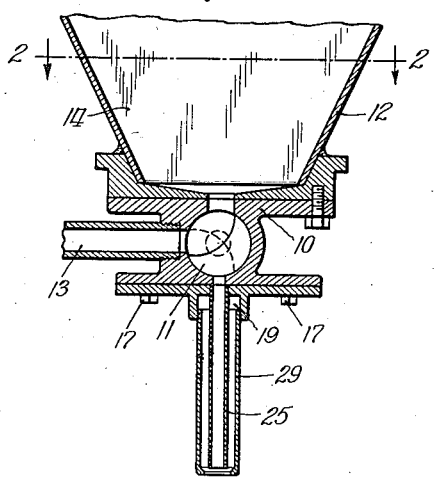
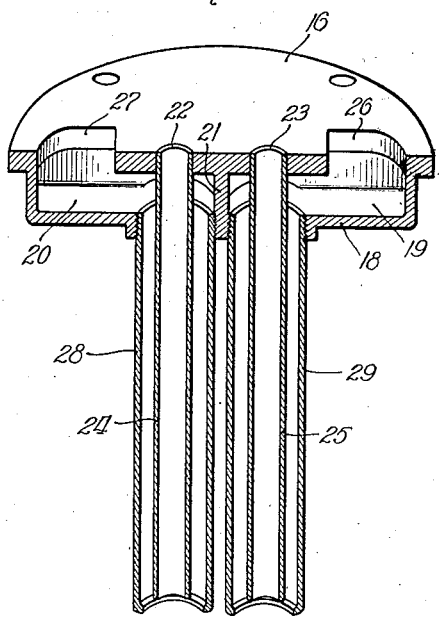
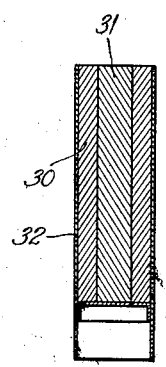
Inventor:
Ralph B. Bagby
By: Murray & Murray
Attys.

Patented Jan. 12, 1937

2,067,750

UNITED STATES PATENT OFFICE 2,067,750

FILLING MACHINE

Ralph B. Bagby, Chicago, Ill.

Application April 20, 1936, Serial No. 75,348

2 Claims. (Cl. 226—100)

My invention relates to filling machines and particularly to a construction adapted to fill a plurality of containers in a distinctive manner to produce a novel package. The construction herein disclosed is similar to that shown in my copending application Serial No. 58,800, filed January 13, 1936.

An object of my invention is to provide apparatus by means of which a plurality of containers may be filled to produce a package such as shown in Fig. 4 of the drawing hereof, in which the tubular container of spirally wound paper is arranged to receive a cylindrical body of ice cream and a core of a confection, such as chocolate candy. The volume of the ice cream greatly exceeds that of the confection and the two materials should be definitely segregated in the package.

Inasmuch as confections such as described must, for practical reasons, be prepared preferably by the dealer who disposes of them at retail, the apparatus necessary for the separation must be simple and of moderate cost. To that end I have provided a machine of simple form, such as shown in my Patent No. 2,032,163 of February 25, 1936 and have devised a simple filling spout, in multiple, so arranged that two packages may simultaneously be filled.

The mechanism utilized in connection therewith is illustrated in the accompanying drawing, in which, Fig. 1 is a vertical sectional view through a portion of a filling machine showing the filling nozzle of my invention, the section being taken on the line 1—1 of Fig. 2;

Fig. 2 is a sectional plan view on the line 2—2 of Fig. 1;

Fig. 3 is a sectional perspective view showing the multiple nozzles of my invention; and, Fig. 4 is a vertical sectional view through one of the packages produced by the use of my filling machine.

The parts of a filling machine necessary to illustrate the relation of this invention thereto are shown in Fig. 1. In this view I have illustrated a casting 10, containing a rotary three-way valve 11, adapted to alternately connect the interior of a hopper 12, with a cylinder 13 and then to connect the cylinder 13 with the filling nozzles about to be described. It will be noted that the hopper 13 is divided into three compartments by means of the two division walls 14—15. The multiple nozzle structure comprises a plate 16 adapted to be secured by bolts 17 to the casting 10. Beneath the plate 16 and extending transversely thereof is a trough 18 providing chambers 19—20, separated by a division wall 21. These parts are preferably integrally formed by casting. At a point near the center of the plate 16, and transversely aligned, are two openings 22—23 adapted to receive filling tubes 24—25, both of which tubes are served by the center compartments in the hopper. That is to say, two cylinders such as 13 are alternately in communication with the center compartment of the hopper and with the two filling tubes 24—25. Also provided in the plate 16 and laterally disposed relative to the openings 22—23 are openings 26—27 into the chambers 19—20, the openings serving the purpose of placing the two side compartments of the hopper in communication with the filling tubes 28—29 that are seated in the lower wall of the trough and define the delivery space for the ice cream indicated at 30 in Fig. 4 the tubes being open to the chambers 19—20. The confection that is delivered through the tubes 24—25 is indicated at 31 in that figure. Two cylinders, not shown in the drawing, but functioning the same as the cylinder 13, serve to withdraw ice cream from the two side compartments of the hopper and deliver it through the tubes 28—29 to the tubular container.

The multiple filling apparatus is very simply constructed and in operation the empty paper tubes 32 are slid over the tubes 28—29, the force of the discharged filling serving to press the tubes downward off the filling tubes until the predetermined amount of filling has been placed therein.

The filling nozzles may readily be disconnected from the machine by removal of the bolts 17 and the tubes thereafter unscrewed, enabling the structure to be thoroughly cleaned from time to time. Furthermore, the apparatus is of extreme simplicity and will function for an indefinitely long period without attention.

I claim:

1. In a filling machine, the combination of a hopper providing three compartments, filling apparatus, including a valve for withdrawing materials from the hopper, a plate beneath the valve, means providing a pair of chambers beneath the plate, said plate having openings above the chambers, a pair of tubes projecting through the plate and through said chambers, and a second pair of larger tubes surrounding the first tubes and open at their upper ends to said chambers, said valve serving to place said center tubes in communication with the middle compartment of the hopper and the respective side compartments with said chambers.

2. In a filling machine, the combination of means providing three juxtaposed compartments, means for withdrawing materials from said compartments, a nozzle plate detachably secured beneath said withdrawing means, said plate having four aligned openings, tubes mounted in the two center openings, means providing separate chambers beneath the two outer openings, said tubes passing through said chambers, second tubes telescoped over the first tubes and spaced therefrom and mounted with their upper ends open to said chambers, said withdrawing means serving to place said center tubes in communication with the middle of said compartments and the respective side compartments with said chambers.

RALPH B. BAGBY.